United States Patent [19]
Henriksson et al.

[11] Patent Number: 5,907,546
[45] Date of Patent: May 25, 1999

[54] METHOD AND APPARATUS FOR SELECTIVELY TRANSMITTING PACKETS OF MESSAGE DATA TO A REMOTE COMMUNICATION STATION

[75] Inventors: Anders Henriksson; Carl Fredrik Johansson, both of Göteborg, Sweden

[73] Assignee: Telefonaktiebolaget L/M Ericsson, Stockholm, Sweden

[21] Appl. No.: 08/723,766

[22] Filed: Sep. 30, 1996

[51] Int. Cl.[6] ........................................................ H04J 3/24
[52] U.S. Cl. ............................ 370/349; 370/389; 370/462
[58] Field of Search ..................................... 370/395, 389, 370/316, 349, 347, 329, 312, 314, 337, 338, 351, 352, 353, 355, 447, 442, 461, 462, 468, 470, 471, 474, 476, 475, 412, 428, 229; 371/32, 35, 34

[56] References Cited

U.S. PATENT DOCUMENTS

| | | | |
|---|---|---|---|
| 4,344,171 | 8/1982 | Lin et al. | 371/35 |
| 5,079,765 | 1/1992 | Nakamura | 340/825.08 |
| 5,440,545 | 8/1995 | Buchholz et al. | 370/474 |
| 5,457,680 | 10/1995 | Kamm et al. | 370/332 |

FOREIGN PATENT DOCUMENTS

| | | |
|---|---|---|
| 0 507 626 A2 | 10/1992 | European Pat. Off. . |
| 0507626 | 10/1992 | European Pat. Off. . |
| 35 36 505 A1 | 10/1985 | Germany . |
| 2 229 896 | 10/1990 | United Kingdom . |
| 2270821 | 3/1994 | United Kingdom . |

OTHER PUBLICATIONS

PCT Search Report dated Feb. 16, 1998 for application PCT/SE97/01629.
Mobeen Khan and John Kilpatrick MOBITEX and Mobile Data Standards, IEEE Communications Magazine, No. 3, Mar. 1995, pp. 96–101.

*Primary Examiner*—Dang Ton
*Attorney, Agent, or Firm*—Jenkens & Gilchrist, P.C.

[57] ABSTRACT

Apparatus, and an associated method, selectively transmits packets of message data between a sending and a receiving station. When a packet of message data is received at a receiving station, the receiving station acknowledges reception thereat of the packet with an acknowledgment response signal, transmitted back to the sending station. If the sending station fails to detect an acknowledgment response signal, a packet of activity-request data is sent to the receiving station. If the receiving station fails to acknowledge reception of the packet of activity-request data, a determination is made that the receiving station would be unlikely to be able to receive an additional packet of message data. A channel to be used to transmit the packet of message data can instead be reallocated for other purposes.

29 Claims, 4 Drawing Sheets

METHOD AND APPARATUS FOR SELECTIVELY TRANSMITTING PACKETS OF MESSAGE DATA TO A REMOTE COMMUNICATION STATION

The present invention relates generally to the communication of packets of message data between a sending and a receiving station of a radio communication system. More particularly, the present invention relates to a method, and an associated apparatus, for selectively transmitting an additional packet of message data from the sending to the receiving station when a determination is made that the receiving station is likely to receive the additional packet of message data.

If the receiving station fails to acknowledge reception of a selected number of packets of message data transmitted thereto, one or more packets of activity-request data are instead sent to the receiving station. An acknowledgment of reception of a packet of activity-request data, or lack of such reception, is determinative of the likelihood that the receiving station shall receive the additional packet of message data.

If a determination is instead made that the remote communication station is unlikely to receive the additional packet of message data, the additional packet is not sent. Thereby, the portion of the frequency spectrum allocated to the radio communication system is more efficiently utilized. The channels are used to transmit packets of message data which are likely to be received, and packets of message data which are unlikely to be received are selectively not transmitted, thereby freeing-up channels for utilization to transmit other packets of message data to other receiving stations.

The receiving station is determined to be likely to receive the additional packet of message data if acknowledgment of reception by the receiving station of a previous packet of message data is detected at the sending station. If the acknowledgment of reception of a selected number of previously-transmitted packets of message data has not been detected, the sending station transmits one or more packets of activity-request data to the receiving station. The packet of activity-request data is of a length significantly less than the length of a typical packet of message data. Transmission of such a packet of activity-request data, therefore, reduces the channel allocation required to send a packet used to determine whether the receiving station is able to receive packets sent thereto. The additional packet of message data is thereafter transmitted to the receiving station if the sending station detects that the receiving station has received the packet of activity-request data.

The present invention may, for example, be embodied in a Mobitex (tm) system, which communicates message frames to mobile radio modems. Because only message frames which are likely to be received by a mobile radio modem are transmitted, the channel capacity of the system if effectively increased. Message frames which are determined to be unlikely to be received by a mobile radio modem are not transmitted. Instead, the channel can be used to send message frames to another mobile radio modem.

BACKGROUND OF THE INVENTION

A communication system is formed, at a minimum, by a transmitter and a receiver interconnected by a communication channel. The transmitter forms at least a portion of a sending station, and the receiver forms at least a portion of a receiving station. Communication signals transmitted by the sending station are transmitted upon the communication channel to be received by the receiving station.

A radio communication system is a communication system in which the communication channel is formed of a portion of the electromagnetic frequency spectrum. A fixed or hard-wired connection is not required to form a link between the sending and receiving stations. A radio communication system is therefore advantageously utilized when the use of such a fixed or hard-wired connection would be inconvenient or impractical.

One type of packet data radio communication system communicates packet data between the sending and receiving stations. In packet data communications, data which is to be sent to the receiving station is formatted into packets. Once formatted into packets, the information can be transmitted to the receiving station in discrete bursts, formed of a single packet, or a single series of packets, to the receiving station. In several of such systems, the packets are transmitted when a channel is available upon which to transmit the packet.

A Mobitex (tm) system is exemplary of a radio communication system which utilizes packet data communications to communicate information between a sending station and a receiving station. A Mobitex (tm) system is a multi-user system formed of a Mobitex network and a plurality of mobile radio modems. Information to be communicated to a mobile radio modem is formatted into frames of data, each frame of data forming a packet which can be transmitted to the mobile radio modem. Sequences of frames are transmitted to the mobile radio modem to effectuate the communication of significant amounts of information to the mobile radio modem. When the mobile radio modem receives a message frame, the modem transmits, back to the Mobitex network, an acknowledgment signal, acknowledging reception of the message frame.

Because a radio communication channel is not an ideal channel, the message frames transmitted upon such channels are susceptible to signal quality degradation. Such signal quality degradation can occur, for example, due to interference introduced upon the signal channel. excessive separation distance between the Mobitex network and the mobile modem, or other communication vagaries. If the signal quality degradation is significant, a message frame transmitted by the Mobitex network might not be detected by the mobile radio modem.

If the mobile radio modem does not detect the frames, no acknowledgment is returned to the network. In spite of such lack of acknowledgment, in at least one existing Mobitex system, a large number of message frames, up to, or in excess of, twelve message frames, are continued to be transmitted to the mobile radio modem, without acknowledgment by the mobile radio modem of any of the message frames. And, even after transmission of such large number of message frames, the network merely designates the radio modem to be in an inactive state. The sender of the message frames might then be able merely to store such message frames, otherwise to be transmitted to the radio modem, in a memory location, such as a message mailbox location associated with the radio modem.

As with many other radio communication systems, the portion of the electromagnetic spectrum allocated for use by a Mobitex system is limited. Any manner by which the allocated portion of the spectrum can be more efficiently utilized would permit the capacity of the Mobitex system to be effectively increased. Because the transmission of the long sequences of message frames to a mobile radio modem, unable to receive such frames, is an inefficient utilization of the allocated spectrum portion, a manner by which to determine quickly such lack of reception of the message frames would be beneficial.

More generally, in any communication system in which packet data is communicated, any manner by which to more efficiently utilize the channel capacity of channels allocated in such a system would be advantageous.

It is in light of this background information related to communication systems utilizing packet data communications that the significant improvements of the present invention have evolved.

SUMMARY OF THE INVENTION

The present invention advantageously provides a manner by which to selectively transmit an additional packet of message data to a receiving station. An additional packet of message data is transmitted to a receiving station when a determination is made that the receiving station is likely to receive the additional packet of message data. If a determination is instead made that the receiving station is unlikely to receive the additional packet, the additional packet is, at least selectively, not sent.

The channels used to form the link between the sending and receiving stations are thereby more likely to be able to be used to transmit the packets of data to receiving stations which are likely to receive the packet of message data rather than to receiving stations, determined to be unlikely to receive the packet of message data. The communication capacity of the channels allocated to such a system is thereby effectively increased.

In one aspect of the present invention, the receiving station is determined to be likely to receive the additional packet of message data if acknowledgment of reception by the receiving station of a previous packet of message data is detected at the sending station. If the acknowledgment of reception of the previous packet of message data has not been detected, the sending station transmits a packet of activity-request data to the receiving station. The additional packet of message data is thereafter transmitted to the receiving station if the sending station detects that the receiving station has received the packet of activity-request data.

In another aspect of the present invention, a Mobitex (tm) network of a Mobitex system selectively transmits message frames to a mobile radio modem, An additional message frame is transmitted to the radio modem if a determination is made that the radio modem is likely to receive the additional packet of message data. The determination is made that the radio modem is likely to receive the additional message frame if a previously-transmitted message frame has been received at the radio modem. If a determination is made that the radio modem has not received the previously-transmitted message frame, an activity-request frame is instead transmitted. A determination is thereafter made as to whether the radio modem has received the activity-request frame. If the radio modem is determined to have received the activity-request frame, the additional message frame is transmitted to the radio modem. Otherwise, the additional message frame is not transmitted to the radio modem, as the mobile radio modem is unlikely to be able to receive the additional message frame.

In another aspect of the present invention, a comparison is made between the length of the additional message frame and the activity-request frame. In an existing, Mobitex system, frames of data contain up to thirty-two blocks of data, each block containing eighteen bytes of data. The blocks of data follow a header. Conversely, an activity-request frame can include merely a single block of data, following a header. If the comparison indicates that the message frame is smaller than, or not significantly larger than, the activity-request frame, the message frame is transmitted to the radio modem rather than the activity-request frame.

In another aspect of the present invention several message frames, to which no acknowledgment is detected by the Mobitex network, are permitted to be transmitted to the radio modem before an activity-request frame is transmitted to the radio modem. If an acknowledgment to the activity-request frame is detected at the Mobitex network, the previously-transmitted message frames to which there had been no acknowledgment may be re-transmitted and then the additional message frame is transmitted to the mobile radio modem. The previously-transmitted message frames are re-transmitted, for instance, when such frames had been stored in a message mailbox.

In these and other aspects, therefore, apparatus, and an associated method, for selectively transmitting packets of message data and packets of activity-request data to a receiving station from a sending station forming a portion of a packet switching network is disclosed. The sending station of the packet switching network is operable to communicate packets of data to the at least one receiving station. A transmitter is selectively coupled to receive the packets of message data and the packets of activity-request data. The transmitter transmits the packets of message and activity-request data, respectively, when received thereat. A response detector detects whether acknowledgment response signals are generated at the remote communication station. Each acknowledgment response signal acknowledges reception at the remote communication station of a packet transmitted thereto by the transmitter. A packet-data controller is operative responsive to detections made by the response detector. The packet-data controller controls coupling of the transmitter, selectively to receive a packet of message data and a packet of activity-request data, The transmitter is permitted to be coupled to receive the packet of message data when detection is made by the response detector of an acknowledgment response signal responsive to at least one packet previously transmitted by the transmitter. And, the transmitter is coupled to receive the packet of activity-request data when detection is made by the response detector of an absence of the acknowledgment response signal responsive to the at least one packet previously transmitted by the transmitter.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
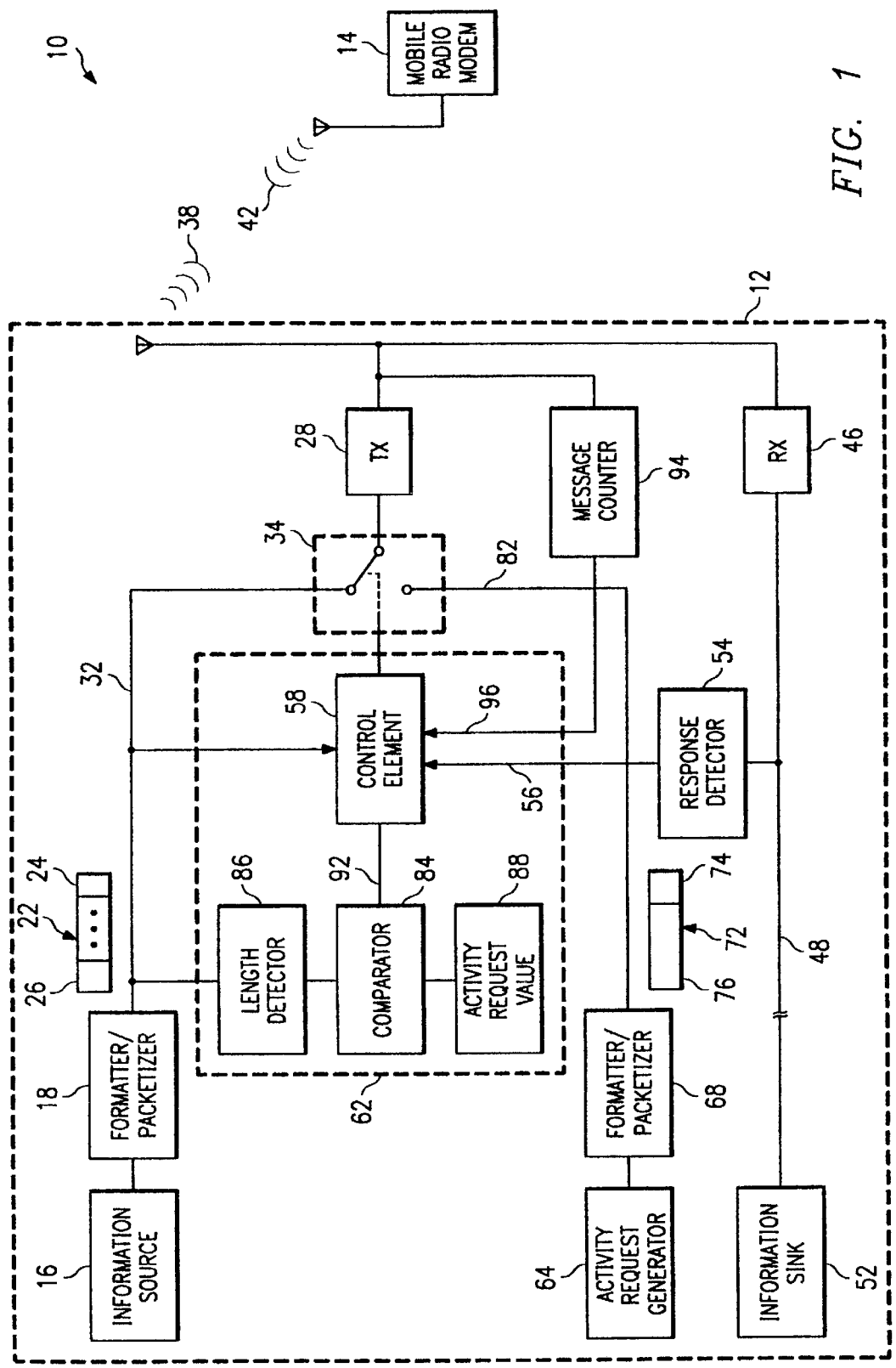
FIG. 1 illustrates a functional block diagram of a radio communication system in which an embodiment of the invention is operative.

Referring first to FIG. 1. a radio communication system, shown generally at 10, in which an embodiment of the present invention is operative. In the illustrated, exemplary embodiment, the communication system 10 forms a Mobitex (tm) system in which frames of data are communicated between a Mobitex network 12 and a mobile radio modem 14.

Operation of the embodiment of the present invention embodied therein facilitates the efficient usage of the channels allocated to communications between the network 12 and modem 14. Message frames to be transmitted to the mobile radio modem 14 are transmitted to the modem 14 if the modem is likely to receive the message frame. If a determination is made that th e radio modem 14 is unlikely to receive the message frame, the message frame is selectively not sent to the radio modem. The channel upon which the message frame would otherwise be communicated to the radio modem 14 can instead be allocated to communicate message frames to other radio modems. As message frames which are unlikely to be received by a radio modem are selectively not transmitted by the network 12, the effective capacity of the channels allocated to the communication system 10 is effectively increased.

The network 12 is shown, in the exemplary embodiment, to include an information source 16 at which the information to be communicated to the radio modem 14 is contained. While the information source 16 is shown functionally in the figure, the data of which the information source is representative can be generated thereat or can be supplied thereto, all in conventional fashion.

The information source 16 is coupled to a formatter-packetizer 18 which formats the data applied thereto into a form pursuant to the communication scheme by which the communication system 10 is operable. In the exemplary embodiment in which the communication system 10 forms a Mobitex system, the information is formatted into frames of data. An exemplary message frame 22 is illustrated in the figure. Each message frame formed by the formatter-packetizer 18 includes a header portion 24 followed by a maximum of thirty-two blocks 26 of data. Each block 26 of data is formed of up to eighteen bytes of data.

Once formatted and packetized, message frames are selectively applied to a transmitter 28 by way of line 32. The selected coupling of the line 32 to the transmitter 28 is indicated in the figure by way of a switch element 34. When the switch element 34 couples the line 32 to the transmitter 28, the transmitter 28 is operable to modulate the message frame 22 upon a selected channel forming a link between the network 12 and radio modem 14. The modulated signal 38 shown in the figure is representative of the modulated signal generated by the transmitter 28 upon the link between the network 12 and the radio modem 14.

As described previously, when the mobile radio modem 14 receives the message frame transmitted thereto, the modem 14 acknowledges the reception thereat of the message frame. The mobile radio modem 14 generates and transmits back to the network 12 an acknowledgment response 42. If, however, the modem 14 fails to receive the message frame, no acknowledgment response is generated or transmitted back to the network 12.

In a conventional Mobitex system, a message to be transmitted to the radio modem 14 might be lengthy and require a plurality of message frames 22 to be transmitted to the modem 14 to effectuate the communication of the information thereto. If so, a plurality of message frames 22 are transmitted to the mobile radio modem 14 irrespective of detection of acknowledgment responses 42 returned to the network 12 by the radio modem 14. That is to say, even without an indication of reception of previous message frames 22 by the modem 14, additional message frames 22 are transmitted thereto.

The network 12 further includes a receiver 46 for receiving uplink signals transmitted thereto by mobile radio modems, such as the modem 14. For instance, when the mobile radio modem 14 acknowledges reception of a message frame transmitted thereto with an acknowledgment to response 42, the receiver 46 is operable to receive such acknowledgment response. The receiver 46 is operable in conventional manner to demodulate the received signal and to generate signals representative thereof on the line 48 to be applied through additional circuitry (not shown, but conventional in nature) to an information sink 52.

A response detector 54 is also coupled to the line 48 and is operable to detect times in which an acknowledgment response 42 is received by the receiver 46 of the network station 12. When the response detector 54 detects reception of an acknowledgment response, the response detector generates a signal indicative of such reception on line 56.

The line 56 is coupled to a control element 58 of a control device 62. Responsive to such indications, the control element 58 is operable, inter alia, to control the switch position of the switch element 34.

The network station 12 further includes an activity-request generator 64. The activity-request generator is operable to generate an activity-request. The activity-request is used during operation of an embodiment of the present invention to query the status of the mobile radio modem 14. The activity-request generated by the generator 64 is applied to a formatter-packetizer 68. The formatter-packetizer 68 is operable in manners analogous to operation of the formatter-packetizer 18 to format the activity-request applied thereto in manners according to the communication scheme in which the communication system 10 is operable. Again, in the exemplary embodiment in which the communication system 10 forms a Mobitex system, the formatter-packetizer 68 is operable to form an activity-request frame 72 formed of a header 74 and a single block 76 forming the activity-request. The activity-request frame generated by the formatter-packetizer 68 is generated on line 82 and is also selectively applied to the transmitter 28 by way of the switch element 34.

During operation of an embodiment of the present invention, in the absence of detection by the response detector 54 of an acknowledgment response 42 returned to the network station 12 by the mobile radio modem 14 responsive to transmission of a message frame 22 to the modem 14, the control element selectively connects the line 82 to the transmitter 28. When the line 82 is coupled to the transmitter 28, the activity-request frame 72 is modulated by the transmitter 28 and transmitted to the mobile radio modem 14. As the activity-request frame 72 is formed of only a single block 76, the link-time required to transmit the activity-request frame 72 to the modem 14 is less than the link-time required to transmit a message frame 22 thereto if the message frame contains more than one block 26.

In the illustrated embodiment, the control device 62 is further shown to include a comparator 94. The comparator 94 is coupled both to a length detector 86 and to a memory device 88 at which an activity-request value is stored. The length detector 86 is coupled to the line 32 and is operable to determine the frame lengths of the frames 22 generated on the line 32.

The activity-request value stored in the memory element 88 is of a value corresponding to the length of the activity-request frame 72. Because the activity-request frame 72 is of a block length of a single block, the activity-request value is a constant value and is indicative thereof. In another embodiment, the length detector 86 is used also to determine the length of the activity-request frame in substitution for the activity-request value stored in the memory element 88.

The comparator 84 is operable to compare the lengths of the message frames 22 determined by the length detector 86 with the activity-request value stored in the memory element 88. The comparator 84 generates a comparison signal on line 92 which is coupled to the control element 58.

In one embodiment of the present invention, the control element 58 selects the switch position of the switch element 34 to be in a switch position to apply the activity-request frame 72 to the transmitter 28 if both no acknowledgment response 42 has been detected by the response detector 54 and the message frame 22 to be transmitted next to the mobile radio modem 14 is less than a selected length, such as the length of the activity-request frame 72 or a small multiple, or the like, thereof. Such embodiment thereby permits a message frame 22 to be transmitted to the mobile radio modem 14 in the absence of detection of prior acknowledgment responses 42 to previously-transmitted message frames 22 if the next message frame to be transmitted is not of a significantly greater length than the activity-request frame 72.

In the illustrated embodiment, the control device 62 is further shown to include a message frame counter 94. The message frame counter 94 is coupled to an output side of the transmitter 28 and is operable to count the number of frames transmitted by the transmitter 28 to the mobile radio modem 14. The counted number of message frames transmitted to the mobile radio modem 14 is provided to the control element 58 by way of line 96. In one embodiment, the packet counter 94 is able to distinguish between message frames sent to separate mobile radio modems by the network station 12.

In another embodiment of the present invention, the control element 58 is operable to select the switch position of the switch element 34 to be positioned to couple the line 82 to the transmitter 28 responsive, in part, to the count of the counter 94. When a selected number, such as two, message frames have been transmitted to a particular mobile radio modem without detection by the response detector 54 of acknowledgment responses responsive to such message frames line 82 is coupled to the transmitter 28. And, the activity-request frame 72 is transmitted.

In an exemplary embodiment of operation of the present invention, message frames 22 are transmitted to the modem 14 and acknowledgment responses 42 are generated at the modem 14 responsive to reception at the modem of such message frames. If the response detector 54 does not detect an acknowledgment response 42, the control element alters the switch position of the switch element 34 and causes the network station 12 instead to transmit an activity-request frame to the modem 14. If the modem 14 does not acknowledge with an acknowledgment response 42 the reception of the activity-request frame, additional message frames 42 are not continued to be transmitted to the mobile 14. A determination is thereby made that the modem 14 is unlikely to receive subsequent message frames 22 and the channels forming the link can instead be allocated to effectuate communications with other modems.

Figure 2:
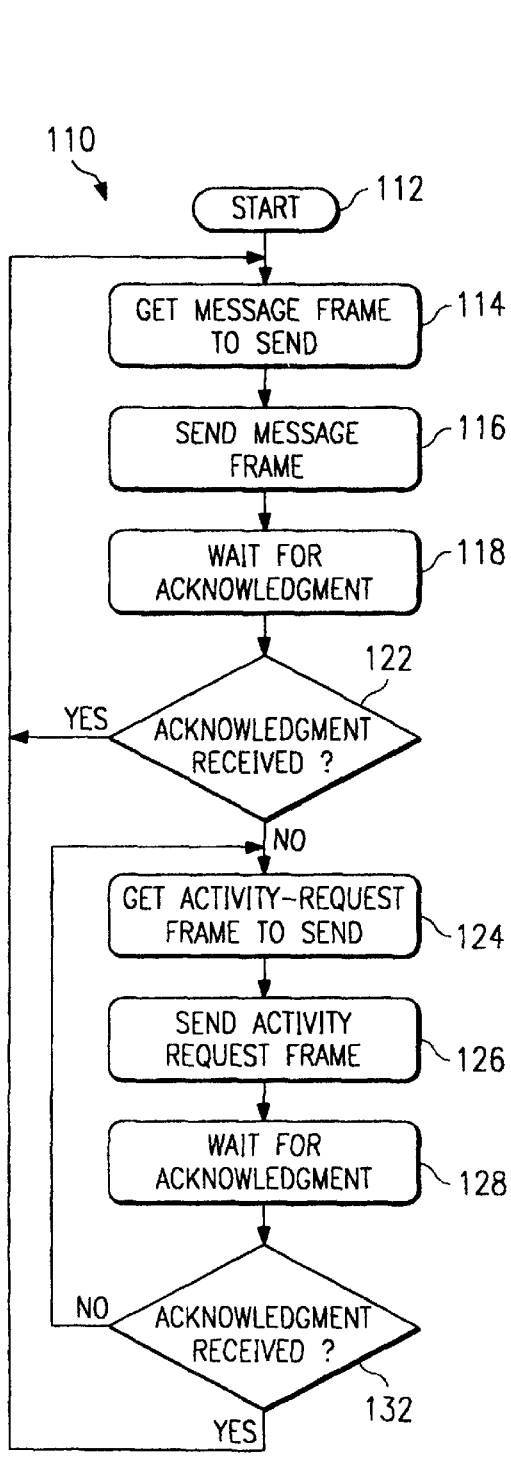
FIG. 2 illustrates a method flow diagram listing the method steps of the method of an embodiment of the present invention.

FIG. 2 illustrates a method, shown generally at 110, listing the method steps of an embodiment of the present invention. The method is operable selectively to transmit message frames from a sending station, such as the network station 12 shown in FIG. 1, to a receiving station, such as the mobile radio modem 14, also shown in FIG. 1.

After entry, indicated by the start block 112, a message frame to be sent to the receiving station is retrieved, here indicated by the block 114. Thereafter, and as indicated by the block 116, the message frame is sent to the receiving station.

As described previously, when the receiving station receives the message frame, the receiving station acknowledges the reception thereat of the message frame. Following transmission of the message frame to the receiving station, the sending station waits, indicated by the block 118, for reception of an acknowledgment response. Subsequent to the selected time periods, a determination is made, as indicated by the decision block 122, as to whether an acknowledgment response has been received. If so, the yes branch is taken back to block 114 and a subsequent message frame, if any, is retrieved to be sent to the receiving station. In one embodiment, a determination is also made as to whether transmission of any other signal generated by the receiving station has been detected. For instance, and with respect to a Mobitex system, if a modem-generated packet of message data is received at the network station, the yes branch is also taken back to the block 114. Such determination can also be made, for instance, by way of interrupts, or the like.

If an acknowledgment response has not been received, the no branch is taken from the decision block 122 to block 124 whereat an activity-request frame is retrieved. Once retrieved, the activity-request frame is transmitted to the receiving station, as indicated by the block 126.

Again, the sending station awaits for a selected time period to await an acknowledgment response from the receiving station, the acknowledgment response indicating reception at the receiving station of the activity-request frame.

A determination is made at the decision block 132 as to whether an acknowledgment response has been received. If so, the yes branch is taken back to the block 114 and a message frame to be transmitted to the modem 14 is once again retrieved. In one embodiment, a frame previously-transmitted to the receiving station and not acknowledged to have been received at the receiving station can be stored in a message mailbox, and such frames are re-transmitted. When the re-transmitted message frame is again transmitted, and reception thereof at the receiving station is acknowledged, subsequent message frames, if any, are thereafter transmitted to the receiving station. Again, in one embodiment, a determination is also made as to whether transmission of any other signal by the receiving station is detected, similar to that described with respect to the decision block 122.

If, conversely, at the decision block 132, an acknowledgment to the transmission of the activity-request frame 126 has not been received, the no branch is taken back to block 124, and the activity-request frame is again sent to the receiving station. While not separately illustrated, in one embodiment of present invention, if no response has been made subsequent to transmission of a selected number of activity-request frames to the receiving station, additional activity-request frames are not continued to be transmitted for at least a selected pause.

Operation of the method 110 permits more efficient utilization of the communication channels allocated in a multi-user communication system utilizing packet data communications. Packets of data to be transmitted to a receiving station are transmitted if the packets of data are likely to be received at the receiving station. If the packets of message data are determined not to be likely to be received by the receiving station, the sending station instead sends activity requests to inquire of the activity status of the receiving station. If acknowledgment of reception of the activity-request is detected by the sending station, additional message frames are sent to the receiving station.

Figure 3:
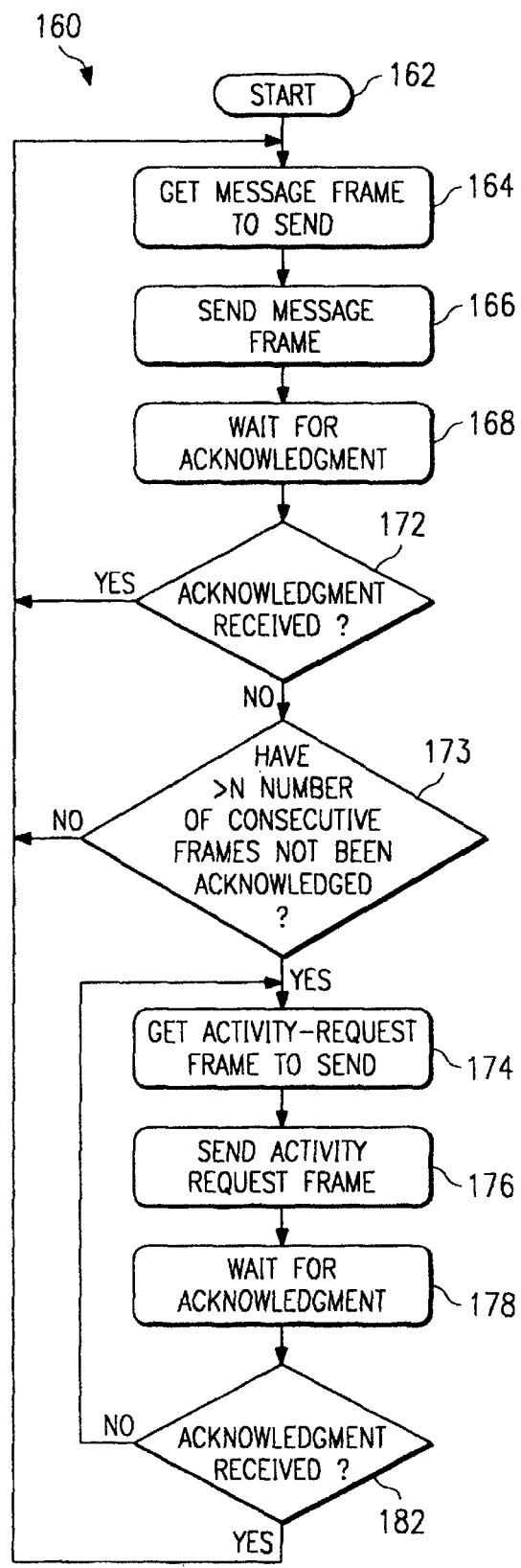
FIG. 3 illustrates a method flow diagram, similar to that shown in FIG. 2, but listing the method steps of the method of an other embodiment of the present invention.

FIG. 3 illustrates a method, shown generally at 160, of operation of another embodiment of the present invention. The method again is operable selectively to transmit message frames from a sending to a receiving station, such as the network station 12 and radio modem 14 shown in FIG. 1. While described with respect to the system 10 shown in FIG. 1, the method 160 can, of course, be analogously utilized to selectively transmit data to a receiving station in other communication systems.

After entry, as indicated by the start block 162, a message frame to be sent to a receiving station is received, as indicated by the block 164. Thereafter, and as indicated by the block 166, the message frame is transmitted from the network station to the radio modem.

The network station waits for a selected time period to detect reception of an acknowledgment response signal transmitted thereto by the radio modem. A determination is made at the decision block 172 as to whether an acknowledgment response signal, acknowledging reception of the message frame, at the radio modem, has been received at the network station. If so, the yes branch is taken back to block 164 and a subsequent message from is retrieved. Determinations can further be made responsive to detection of other signals, analogous to that described with respect to decision block 122, shown in FIG. 2.

If no acknowledgment response has been detected at the network station, the no branch is taken from the decision block 172 to decision block 173. At decision block 173, a determination is made as to whether a selected number, N, of consecutive frames sent to the radio modem have not been acknowledged to have been received by the radio modem. If not, the no branch is taken back to block 164 and a subsequent message frame is retrieved.

If, however, the selected number of consecutive frames have been transmitted to the radio modem without acknowledgment of their receipt thereat, the yes branch is taken from the decision block 173 to block 174. At block 174, an activity-request frame is retrieved.

Thereafter, and as indicated by the block 176, the activity-request frame is transmitted to the radio modem. The network station waits a selected time period to wait for acknowledgment from the radio modem of reception thereat of the activity-request frame.

A determination is made at the decision block 182 as to whether the acknowledgment response generated by the radio modem has been received. If an acknowledgment response has been received, the yes branch is taken from the decision block 182 back to block 164 and a message frame is once again retrieved. Analogous to the embodiment described previously, in one embodiment, when the yes branch is taken back to the block 164 from the decision block 182, and the N previously-transmitted message frames, in at least one embodiment, are again transmitted to the radio modem in manners as described above. Again, determinations can further be made responsive to detection of other signals, analogous to that described with respect to decision block 132, shown in FIG. 2.

Figure 4:
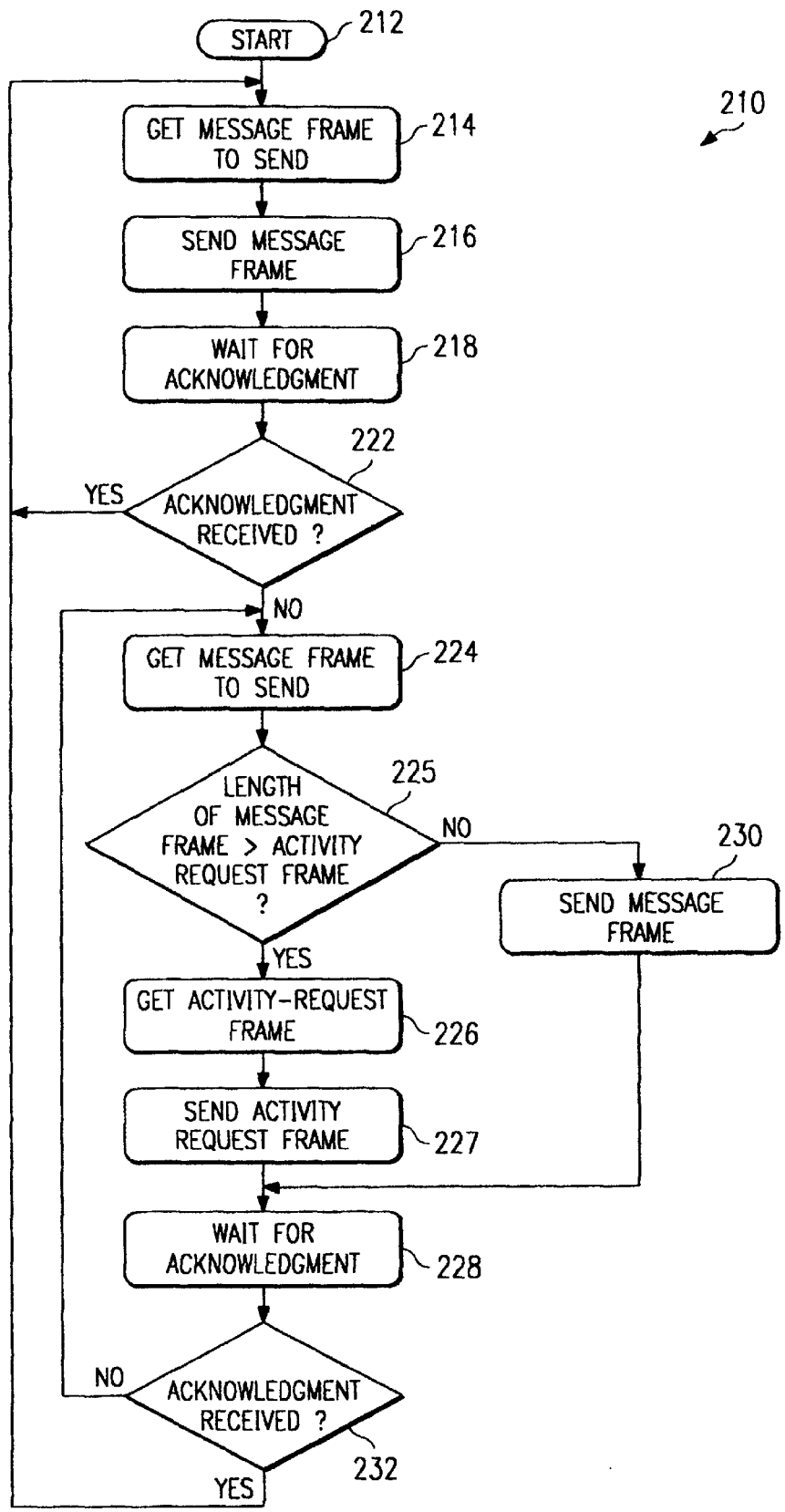
FIG. 4 illustrates another method flow diagram, similar to those shown in FIGS. 2–3, but of another alternate embodiment of the present invention.

FIG. 4 illustrates a method, shown generally at 210, of the method steps of the method of another embodiment of the present invention. The method 210 also selectively transmits message frames from a sending to a receiving station, such as from the network station 12 to the radio modem 14, shown previously in FIG. 1. Again, while the exemplary embodiment of the method 210 describes operation with respect to transmission of packets of data formatted into frames of data, the method 210 may similarly be carried out to selectively transmit other types of packet data between a sending and a receiving station.

After entry, indicated by the start block 212, a message frame to be sent is retrieved, as indicated by the block 214. Thereafter, and as indicated by the block 216, the message frame is sent from the network station to the mobile radio modem.

The network station awaits a selected time period to await and acknowledge responses generated by the radio modem responsive to detection thereat of the message frame transmitted to the radio modem. At decision block 222, a determination is made as to whether the acknowledgment response has been received at the network station. If so, the yes branch is taken back to block 214, and an additional message frame, if any, is retrieved. Otherwise, the no branch is taken from the decision block 212 to block 224 and the additional message frame, if any, is similarly also retrieved. Analogous to decisions made at the decision blocks 122 and 172 shown previously in FIGS. 2 and 3, determinations can similarly be made responsive to detection of other signals generated at the receiving station.

Thereafter, a determination is made, as indicated by the decision block 225, as to whether the length of the message frame, received during the step indicated by the block 224, is of a length greater than the length of an activity request frame.

If so, the yes branch is taken to block 226 and then an activity-request frame is retrieved. Then, as indicated by the block 227, the activity-request frame is transmitted from the network station to the radio modem. Thereafter, and as indicated by the block 228, the network station waits a selected time period to detect reception of an acknowledgment response signal transmitted by the radio modem, acknowledging reception of the activity-request frame.

If, conversely, the length of the message frame is not greater than the length of the activity-request frame, the no branch is taken from the decision block 225 to block 230 and the message frame retrieved, as indicated by the block 224, is instead sent to the radio modem. Thereafter, the network station awaits the selected time period, as indicated by the block 228, and as described previously.

Thereafter, and as indicated by the decision block 232, a determination is made as to whether an acknowledgment response has been detected at the network station. If so, the yes branch is taken back to the block 214 and another message frame is retrieved. If not, the no branch is taken from the decision block 232 back to the block 224. Again, analogous to decisions made at the decision blocks 132 and 182 shown previously in FIGS. 2 and 3, determinations can similarly be made responsive to detection of other signals generated at the receiving station.

Operation of the method 210 permits message frames to be selectively transmitted to the radio modem. If the message frames are determined to be likely to be received by the radio modem, message frames, if any, are continued to be transmitted to the radio modem. If the radio modem is determined to be unlikely to receive additional message frames, the channels allocated to form the link between the network station and the particular radio modem can be reallocated for other purposes.

Figure 5A:
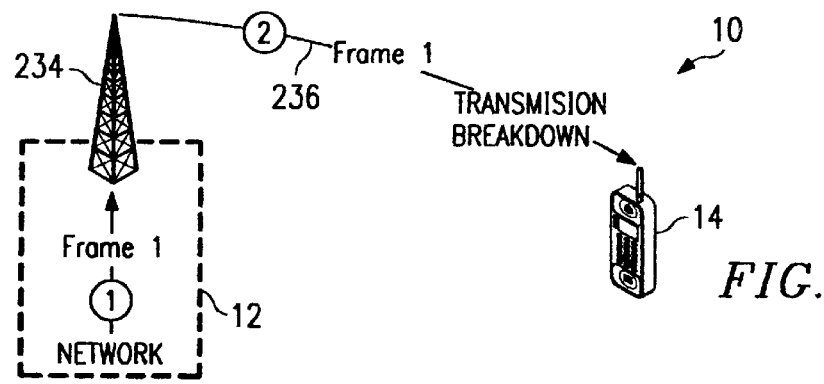
FIGS. 5A–B illustrate exemplary operation of an embodiment of the present invention.
Figure 5B:
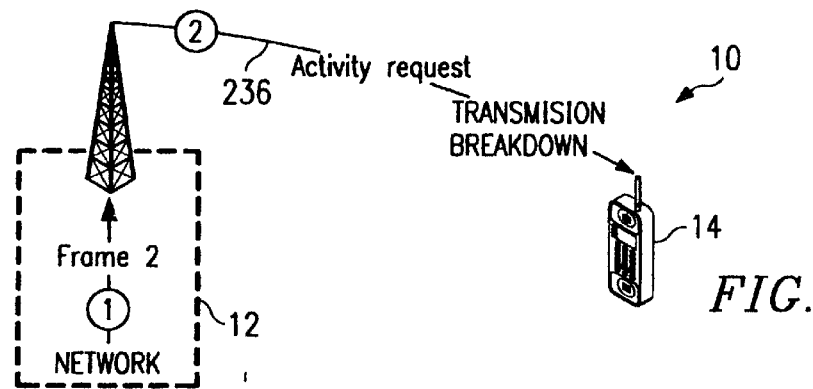

FIGS. 5A–B illustrate exemplary operation of an embodiment of the present invention by which a Mobitex (TM) network station 12 of a Mobitex system selectively transmits message frames to a mobile radio modem 14. When information to be transmitted to the mobile radio modem requires successive numbers of frames to effectuate the communication of the information to the modem 14, determinations are made at the network station as to whether transmission of an additional message frame to the radio modem 14 would be likely to be received by the radio modem. If a determination is made that the radio modem 14 is unlikely to receive the additional message frame, the channel allocated to form the link between the network station and the radio modem can be reassigned to make better use of the channel.

FIG. 5A illustrates the network station 12 and the radio modem 14 of the Mobitex system 10. The message frame 22 generated at the network station 12 is transmitted by a base station 234 forming a portion of the network station 12. The message frame is transmitted upon a radio channel, here radio channel 236, to the radio modem 14. As indicated in FIG. 5A, a transmission breakdown prevents the communication of the message frame to the radio modem 14. Because the message frame is not received at the radio modem 14, the modem 14 does not acknowledge reception of the message frame with the generation of an acknowledgment response signal.

FIG. 5B again illustrates the Mobitex system having the network station 12 and radio modem 14. In the exemplary operation illustrated in FIG. 5B, in the absence of detection at the network station 12 of an acknowledgment response signal generated by the radio modem 14 acknowledging reception of the message frame, an activity-request frame 72 is generated and transmitted upon the radio channel 236 to the radio modem 14. Again, in FIG. 5B a transmission breakdown also prevents the activity-request frame from being received at the radio modem 14. Because the radio modem 14 does not receive the activity request frame, no acknowledgment response signal is generated at the radio modem and returned to the network station. As described previously, when the network station fails to receive an acknowledgment response signal acknowledging response of the activity-request frame, additional message frames are not transmitted to the radio modem, and the channel 236 allocated to form the link between the station 12 and radio modem 14 can be reallocated.

Figure 6A:
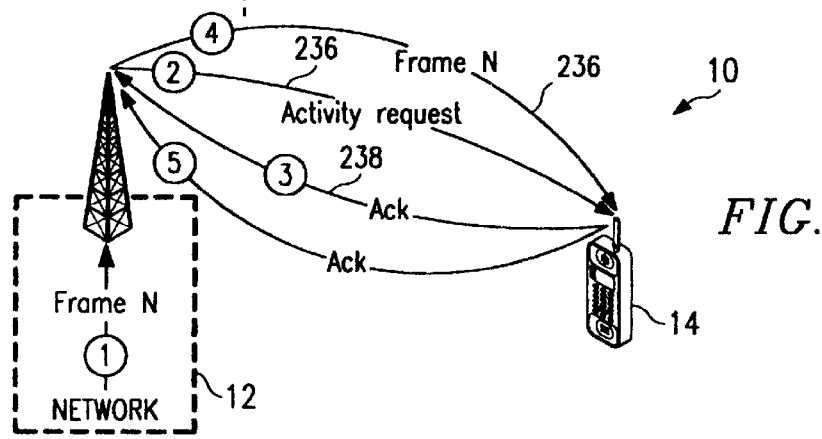
FIGS. 6A–B also illustrate graphically operation of an embodiment of the present invention by which to communicate packets of data between a sending and a receiving station.

FIG. 6A illustrates operation of an embodiment of the present invention in which, when the activity-request frame 22 is transmitted to the radio modem 14, the modem 14 receives the activity-request frame. When the radio modem 14 receives the activity-request frame, the radio modem generates and transmits back to the network station an acknowledgment response signal, here indicated on line 238.

When the network station detects reception of the acknowledgment response signal transmitted upon the channel 238, a determination is made that the radio modem 14 would be likely to receive additional message frames if transmitted thereto. Thereafter, a subsequent message frame 22, here indicated by frame N, is generated and transmitted upon the radio channel 236 to the radio modem 14. When the radio modem 14 receives the additional message frame, an acknowledgment response signal is generated and returned to the network station, here also indicated to be upon the radio channel 238.

Figure 6B:
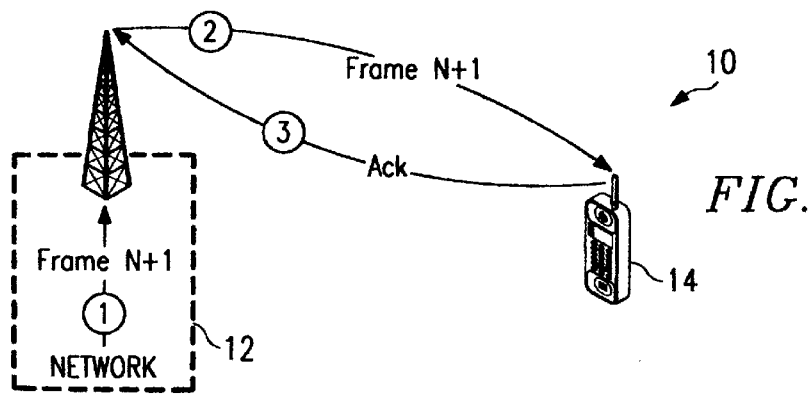

FIG. 6B illustrates continued operation of the Mobitex system to communicate an additional message frame from the network station 12 to the mobile radio modem 14. Here, an N+1 frame is generated and transmitted upon the radio communication channel 236 to the mobile radio modem 14. When received at the modem 14, the modem 14 generates an acknowledgment response signal, which is transmitted back to the network station 12.

Operation of an embodiment of the present invention permits advantageous utilization of the portion of the electromagnetic radio spectrum allocated to a particular communication system operable to communicate packets of data between a sending and a receiving station. If a determination is made that the receiving station is unlikely to receive an additional packet of message data, additional packets of message data are not transmitted to the receiving station. Instead, the channel allocated from the link between the transmitting and the receiving stations can be reallocated for other purposes.

The previous descriptions are preferred examples for implementing the invention, and the scope of the invention should not necessarily be limited by this description. The scope of the present invention is defined by the following claims.

What is claimed is:

1. In a packet switching network operable to communicate packets of data to a remote communication station, an apparatus for selectively transmitting packets of message data and packets of activity-request data to the remote communication station, said apparatus comprising:

a transmitter selectively coupled to receive the packets of message data and the packets of activity-request data, where said packets of activity request data are used instead of the packets of message data for reducing channel allocation;

said transmitter for transmitting the packets of message data and the packets of activity-request data, respectively, when received thereat;

a response detector for detecting whether acknowledgment response signals are generated at the remote communication station, each acknowledgment response signal acknowledging reception at the remote communication station of a the transmitted packet; and a packet-data controller operative responsive to detections made by said response detector, said packet-data controller for controlling coupling of said transmitter, selectively to receive a subsequent packet of message data and a subsequent packet of activity-request data, such that the transmitter is selectively coupled to receive the subsequent packet of message data when detection is made by said response detector of the acknowledgment response signal responsive to the transmitted packet and selectively coupled to receive said subsequent packet of activity-request data when detection is made by said response detector of an absence of the acknowledgment response signal responsive to the transmitted packet.

2. The apparatus of claim 1 wherein each packet of message data to which said transmitter is selectively coupled to receive comprise a message frame and wherein each packet of activity-request data to which said transmitter is also selectively coupled to receive comprise an activity-request frame.

3. The apparatus of claim 2 wherein each message frame is formed of a header portion and a message data portion.

4. The apparatus of claim 2 wherein each activity-request frame is formed of a header portion and an activity-request command portion.

5. The apparatus of claim 2 further comprising a frame-length comparator operative at least responsive to detection by said response detector of the absence of the acknowledgment response signal, said frame-length comparator for comparing lengths of the activity-request frame to that of the message frame and for generating a comparison signal responsive thereto.

6. The apparatus of claim 5 wherein said packet-data controller is coupled to receive the comparison signal generated by said frame length comparator, said packet-data controller selectively coupling the transmitter to receive the activity-request frame when said frame length comparator determines the length of the activity-request frame to be less than the length of the message data frame.

7. The apparatus of claim 6 wherein said packet-data controller prevents the transmitter from being selectively coupled to receive the activity-request frame when said frame length comparator determines the length of the activity-request frame to be greater than the length of the message data frame.

8. The apparatus of claim 5 further comprising a message frame length determiner coupled to said frame-length comparator, said message frame-length determiner for determining lengths of the message frames and for providing indications of the lengths determined thereat to said frame length comparator.

9. The apparatus of claim 5 further comprising an activity-request length determiner coupled to said frame-length comparator, said activity-request length determiner for determining lengths of the activity-request frames and for providing indications of the lengths determined thereat to said frame-length comparator.

10. The apparatus of claim 5 wherein the length of the activity-request frame is of a selected length and wherein said frame-length comparator compares the length of the message frames with a value representative of the selected length of the activity-request frame.

11. The apparatus of claim 10 further comprising an activity-request length memory element coupled to said frame-length comparator, said activity-request length memory element for storing the value of the selected length of the activity-request frame.

12. The apparatus of claim 1 wherein said packet-data controller selectively coupling the transmitter to receive the subsequent packet of activity-request data when said response detector detects the absence of the acknowledgment response signal responsive to a selected plurality of transmitted packets.

13. The apparatus of claim 12 further comprising a packet-counter coupled to said transmitter, said packet-counter for counting the plurality of transmitted packets and for indicating to said packet-data controller a value indicative of a number of the packets counted thereat.

14. The apparatus of claim 1 wherein said response detector is operable for at least a selected time interval after transmission of the transmitted packet.

15. The apparatus of claim 1 wherein said response detector is further operable to detect a message-related signal generated at the remote communication station and wherein said packet-data controller selectively coupling the transmitter to receive the subsequent packet of message data when detection is made by said response detector of the message-related signal.

16. A method for selectively transmitting packets of message data and packets of activity-request data from a packet switching network to a remote communication station, said method comprising the steps of:

transmitting a selected number of the packets of message data to the remote communication station;

detecting generation of acknowledgment response signals at the remote communication station, the acknowledgment response signals acknowledging reception at the remote communication station of at least one of the selected number of the transmitted packets of message data;

transmitting at least one subsequent packet of message data to the remote communication station upon receiving an acknowledgment response signal acknowledging response by the remote communication station of the at least one of the selected number of packets of message data; otherwise transmitting the packet of activity-request data to the remote communication station, where said packet of activity request data is used instead of the subsequent packet of message data for reducing channel allocation.

17. The method of claim 16 comprising the further step of detecting generation of at least one acknowledgment response signal at the remote communication station, the at least one acknowledgment response signal acknowledging reception at the remote communication station of the at least one of the transmitted packets of activity-request data.

18. The method of claim 17 comprising the further step of retransmitting the selected number of the transmitted packets of the message data when the at least one acknowledgment response signal acknowledging reception at the remote communication station of the transmitted packet of activity-request data is detected.

19. The method of claim 17 comprising the additional step of temporarily terminating transmission of the at least one subsequent packet of message data to the remote communication station when the at least one acknowledgment response signal acknowledging reception at the remote communication station of the transmitted packet of activity-request data is not detected.

20. The method of claim 16 further comprising the additional step, responsive to detection of no acknowledgment response signals, of comparing lengths of the at least one subsequent packet of message data and the packet of the activity-request data, and wherein the packet of activity-request data is transmitted only if the length of the at least one subsequent packet of message data is greater than the length of the packet of activity-request data.

21. A method for selectively transmitting a subsequent packet of message data from a first radio communication station to a second radio communication station, said method comprising the steps of:

determining whether at least one previously-transmitted packet of message data, transmitted from the first radio communication station to the second radio communication station has been received at the second radio communication station;

transmitting the subsequent packet of message data to the second radio communication station if the at least one previously-transmitted packet of message data is determined to have been received at the second radio communication station; otherwise transmitting a packet of activity-request data to the second radio communication station, where said packet of activity-request data is used instead of the subsequent packet of message data for reducing channel allocation;

determining whether the transmitted packet of activity-request data has been received at the second radio communication station; and transmitting the subsequent packet of message data to the second radio communication station if transmitted the packet of activity-request data is determined to have been received at the second radio communication station.

22. In a packet switching network operable to communicate packets of data to a remote communication station, an apparatus for selectively transmitting packets of message data and packets of activity-request data to the remote communication station, said apparatus comprising:

a transmitter selectively coupled to receive the packets of message data and the packets of activity-request data, said transmitter for transmitting the packets of message and activity-request data, respectively, when received thereat;

a response detector for detecting whether acknowledgment response signals are generated at the remote communication station, each acknowledgment response signal acknowledging reception at the remote communication station of a packet transmitted thereto by said transmitter;

a packet-data controller operative responsive to detections made by said response detector, said packet-data controller for controlling coupling of said transmitter, selectively to receive another packet of message data and another packet of activity-request data, such that the transmitter is permitted to be coupled to receive said another packet of message data when detection is made by said response detector of the acknowledgment response signal responsive to at least one packet previously transmitted by said transmitter and such that said transmitter is selectively coupled to receive said another packet of activity-request data when detection is made by said response detector of an absence of the acknowledgment response signal responsive to the at least one packet previously transmitted by said transmitter;

said packets of message data to which said transmitter is selectively coupled to receive comprise message frames, and said packets of activity-request data to which said transmitter is also selectively coupled to receive comprise activity-request frames; and a frame-length comparator operative at least responsive to detection by said response detector of the absence of the acknowledgment response signal, said frame-length comparator for comparing lengths of the activity-request frame to that of the message frame and for generating a comparison signal responsive thereto.

23. The apparatus of claim 22 wherein said packet-data controller is coupled to receive the comparison signal generated by said frame length comparator, said packet-data controller permitting the transmitter to be coupled to receive the activity-request frame when said frame length comparator determines the length of the activity-request frame to be less than the length of the message data frame.

24. The apparatus of claim 23 wherein said packet-data controller prevents the transmitter from becoming coupled to receive the activity-request frame when said frame length comparator determines the length of the activity-request frame to be greater than the length of the message data frame.

25. The apparatus of claim 22 further comprising a message frame length determiner coupled to receive at least indications of the message frames and to said frame-length comparator, said message frame-length determiner for determining lengths of the message frames and for providing indications of the lengths determined thereat to said frame length comparator.

26. The apparatus of claim 22 further comprising an activity-request length determiner coupled to receive at least indications of the activity-request frames and to said frame-length comparator, said activity-request length determiner for determining lengths of the activity-request frames and for providing indications of the lengths determined thereat to said frame-length comparator.

27. The apparatus of claim 22 wherein the length of the activity-request frame is of a selected length and wherein said frame-length comparator compares lengths of the message frames with a value representative of the selected length of the activity-request frame.

28. The apparatus of claim 27 further comprising an activity-request length memory element coupled to said frame-length comparator, said activity-request length memory element for storing the value of the selected length of the activity-request frame.

29. A method for selectively transmitting packets of message data and packets of activity-request data from a packet switching network to a remote communication station, said method comprising the steps of:

transmitting a selected number of the packets of message data to the remote communication station;

detecting generation of acknowledgment response signals at the remote communication station, the acknowledgment response signals acknowledging reception at the remote communication station of at least one of the selected number of packets of message data transmitted during said step of transmitting;

transmitting at least one additional packet of message data to the remote communication station when generation of an acknowledgment response signal acknowledging response by the remote communication station of the at least one of the selected number of data packets is detected during said step of detecting; otherwise transmitting at least one packet of activity-request data to the remote communication station; and comparing, responsive to detection of no acknowledgment response signals during said step of detecting, the lengths of the at least one additional packet of message data and the at least one packet of the activity-request data, and wherein the at least one packet of activity-request data, transmitted during -said step of transmitting the at least one packet of activity-request data, is transmitted only if the length of the at least one additional packet of message data is greater than the length of the at least one packet of activity-request data.

* * * * *

UNITED STATES PATENT AND TRADEMARK OFFICE
CERTIFICATE OF CORRECTION

PATENT NO. :     5,907,546
DATED      :     May 25, 1999
INVENTOR(S) :    Henriksson et al.

It is certified that error appears in the above-identified patent and that said Letters Patent is hereby corrected as shown below:

Column 4, line 57     Before "invention"
                          Insert --present--

Column 5, line 22     Replace "th e"
                          With --the--

Signed and Sealed this

Twenty-first Day of December, 1999

Attest:

Q. TODD DICKINSON

Attesting Officer        Acting Commissioner of Patents and Trademarks